US009353894B2

(12) United States Patent
Richards et al.

(10) Patent No.: US 9,353,894 B2
(45) Date of Patent: May 31, 2016

(54) DEVICE AND METHOD FOR EFFECTING AND VERIFYING FULL MATING ENGAGEMENT BETWEEN A COUPLER AND A COMPLEMENTARY CORRESPONDING SOCKET

(71) Applicant: Honda Motor Co., Ltd., Tokyo (JP)

(72) Inventors: Gavin Victor Charles Richards, Everett (CA); Scott Alexander Baker, Barrie (CA)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 14/101,445

(22) Filed: Dec. 10, 2013

(65) Prior Publication Data

US 2015/0121673 A1    May 7, 2015

(30) Foreign Application Priority Data

Nov. 7, 2013    (CA) ...................................... 2832926

(51) Int. Cl.
*H01R 13/62*    (2006.01)
*F16L 21/00*    (2006.01)
*H01R 13/631*   (2006.01)
*H01R 43/26*    (2006.01)

(52) U.S. Cl.
CPC ............ *F16L 21/002* (2013.01); *H01R 13/631* (2013.01); *H01R 43/26* (2013.01); *Y10T 29/4978* (2015.01)

(58) Field of Classification Search
CPC ..... F16L 21/002; H01R 43/26; H01R 13/631; Y10T 29/4978
See application file for complete search history.

(56) References Cited

U.S. PATENT DOCUMENTS 6,805,575 B2 * 10/2004 Lappohn .................. H01R 9/18
                                                              439/381

FOREIGN PATENT DOCUMENTS

| CN | 201900342   | 7/2011  |
|----|-------------|---------|
| CN | 202421217   | 9/2012  |
| JP | 08266027    | 10/1996 |
| JP | 2010011614  | 1/2010  |
| JP | 2012182902  | 9/2012  |
| KR | 20010055602 | 7/2001  |
| KR | 20040001666 | 1/2004  |

OTHER PUBLICATIONS

Examiner's Report of Canadian Patent Application No. 2,832,926 dated Feb. 26, 2015.

* cited by examiner

*Primary Examiner* — Ryan J Walters
(74) *Attorney, Agent, or Firm* — Rankin, Hill & Clark LLP

(57) ABSTRACT

A device for effecting and verifying a full mating operable engagement between a slidable coupler and a complementary corresponding socket. The coupler and the complementary corresponding socket are received into a receiving region defined between first and second opposing sidewall portions which squeeze the coupler and the complementary corresponding socket together to effect the full mating operable engagement from a partial mating engagement relationship. A method for use of the device to verifying a full mating operable engagement between a slidable coupler and a complementary corresponding socket is also provided.

20 Claims, 8 Drawing Sheets

DEVICE AND METHOD FOR EFFECTING AND VERIFYING FULL MATING ENGAGEMENT BETWEEN A COUPLER AND A COMPLEMENTARY CORRESPONDING SOCKET

TECHNICAL FIELD

The present disclosure relates to the coupling of couplers and complementary corresponding sockets, and, in particular to couplers and complementary corresponding sockets in operable communication with one another.

BACKGROUND

In assembly line production settings, among other settings, couplers are installed in communication with complementary corresponding sockets where the connection therebetween provides for the transfer of information, electrical current or other mediums such as air or hydraulic fluid. For example, a wiring harness may be prepared with the terminus of one or more electrical wires being attached to a coupler. The coupler is designed to be attached to a complementary corresponding socket, which may be located, for example on a component requiring input from the contacts, wires and/or hoses. The union between the coupler and the complementary corresponding socket completes the path such that the information, electrical current or other medium may be communicated to the component.

By way of example, electrical wires are known to be operably coupled to a coupler or wiring harness and then the coupler is in turn complementarily coupled to a complementary corresponding socket such that electrical current can be transferred to the component. Common in the automotive industry, for example, is the use of such couplers to allow quick connection of electrical leads to components requiring electrical energy in order to operate. The use of couplers not only allows for the quick connection between an electrical current source and a given component, but also to ensure that the correct wire is in communication with the correct receiving terminal such that the component operates correctly. For example, one or more electrically conductive wires are arranged in a wiring harness (coupler) to transfer electrical energy from an electrical energy source where the electrically conductive wires are located at positions in the wiring harness which align with receiving terminals located in socket. The wiring harness and the socket are designed to complementarily and operably engage such that the correct wire communicates with the correct receiving terminal on the socket. The terminals located in the socket have electrical leads that provide electrical energy to a required portion of the component such that the component can operate, for example in the case of an automotive starter motor. By providing the wiring harness coupler with a source of electrical energy connected thereto, a component can be quickly and correctly coupled to the source of electrical energy.

In an automotive assembly line situation, for example, a technician must connect several couplers to complementary corresponding sockets such that components of the automobile can function. Generally the technician has a specific time period target for completing all of the required connections. Given the time constraints, as well as other factors such as impairments to tactile sensation of the technician through the use of work gloves, the connection between the coupler and the complementary corresponding socket is not always fully completed. Although the connection may visually appear to be completed to the technician, in some instances the terminals located in the coupler and the complementary corresponding socket are not in contact because the coupler and the complementary corresponding socket have not been fully engaged. As a result the information, electrical energy or other medium is not transferred though the union of the coupler and the complementary corresponding socket and the component does not receive what is required to operate.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

There is a need for a device for effecting the full mating operable engagement between a coupler and a complementary corresponding socket that overcomes some of the drawbacks of known techniques, or at least, provide the public with a useful alternative to allow communication of electrical energy, information or other medium across a slidingly couplable union.

For example, it would be desirable to provide a device and method for completing the union of a slidable coupler and a complementary corresponding socket such that it can be confirmed that an operable union has been completed therebetween. Such a device could be designed to receive the coupler and the complementary corresponding socket in a receiving region where the coupler and the complementary corresponding socket can only be received in the receiving region when they are in a full mating operable engagement. It would also be desirable to provide indicia that alerts a technician that the coupler and the complementary corresponding socket have been received into the receiving region thereby providing notification that the union therebetween has been correctly completed such that the component receives the required input to operate correctly.

In one aspect there is disclosed a device for effecting full mating operable engagement between a coupler and a complementary corresponding socket. The device comprises a receiving region at least partially defined by first and second opposed sidewall portions spaced apart by a distance designated to receive therebetween the coupler and the complementary corresponding socket only when in full mating operable engagement. At least one of the first and second opposed sidewall portions has an inwardly tapered leading edge for allowing the coupler and the complementary corresponding socket to be received between the first and second opposed sidewall portions at the leading edge when in at least partial mating engagement. The device brings the coupler and the complementary corresponding socket into full mating operable engagement from the at least partial mating engagement upon being urged between the first and second opposed sidewall portions from the leading edge and into the receiving region.

In some embodiments, both of the first and second opposed sidewall portions have tapered leading edges.

In some embodiments, the device further comprises a proximity switch depending into the receiving region and activated by at least one of the coupler and the complementary corresponding socket once in the receiving region. In some embodiments, the proximity switch is operable to output an indicia for indicating that the coupler and the complementary corresponding socket have been received in the receiving region. In still further embodiments of the device, the proximity switch is operatively couplable to a data acquisition device for logging information indicative of the coupler and the complementary corresponding socket being received into receiving region and thereby in the full mating operable engagement.

The device, in some embodiments, further comprises a handle portion exteriorly extending from the receiving region. In some exemplary embodiments, the handle portion exteriorly extends from a back wall of the receiving region. In still further embodiments, the handle portion and the receiving region having an aligned passage for receiving therein a marking instrument, a marking tip of the marking instrument depending into the receiving region to mark at least one of the coupler and the complementary corresponding socket once in the receiving region.

In some embodiments, the receiving region is further defined by a top receiving region wall portion and in some embodiments, the top receiving region wall portion includes an inwardly tapered leading edge portion. Also in some embodiments, the receiving region is further defined by a bottom receiving region wall portion and in some embodiments the bottom receiving region wall portion includes an inwardly tapered leading edge. The bottom receiving region wall portion, in some embodiments wherein the complementary corresponding socket is mounted to a mount via a stem, has at least one stem-receiving notch for receiving the stem therein as the complementary corresponding socket is received in said receiving region.

In some embodiments, wherein one or more supply lines are coupled to at least one of the coupler and the complementary corresponding socket, the device further comprises one or more supply line receiving notches correspondingly defined in one or more of the first or second opposed sidewall portions for receiving therein the one or more supply lines as the coupler and the complementary corresponding socket are received into the receiving region. For example, the one or more supply lines may comprise an electrically conductive line, a pneumatic line or a hydraulic line In some embodiments, at least the first and second opposed sidewall portions are made from a material having a tensile strength of from about 45 MPa to about 70 MPa and some embodiments the device is monolithically formed. In some embodiments, the material has a tensile strength of from about 50 MPa to about 65 MPa.

In another aspect, there is disclosed a method for automatically verifying full mating operable engagement between a coupler and a complementary corresponding socket. The method comprises: aligning a verification tool with the coupler and the complementary corresponding socket when in at least partial mating engagement, said verification tool having a receiving region at least partially defined by first and second opposed sidewall portions spaced apart by a distance designated to receive therebetween the coupler and the complementary corresponding socket only when in the full mating operable engagement, at least one of the first and second opposed sidewall portions having an inwardly tapered leading edge; engaging the coupler and the complementary corresponding socket between the first and second opposed sidewall portions at the leading edge in the at least partial mating engagement; and urging the coupler and the complementary corresponding socket into the receiving region thereby sliding the coupler and the complementary corresponding socket towards one another so as to verifiably effect the full mating operable engagement.

In some embodiments of the method, further comprising having at least one of the coupler and the complementary corresponding socket automatically trigger a proximity switch when received in the receiving region where the proximity switch outputs an indicia. Thereby it is indicated that the coupler and the socket complementary corresponding socket are in the full mating operable engagement.

In some embodiments of the method, the method further comprises automatically marking at least one of the coupler and the complementary corresponding socket when received in the receiving region via a marking instrument having a marking tip disposed in the receiving region thereby visually confirming that the coupler and the complementary corresponding socket are in the full mating operable engagement.

Other aims, objects, advantages and features of the invention will become more apparent upon reading of the following non-restrictive description of specific embodiments thereof, given by way of example only with reference to the accompanying drawings.

BRIEF DESCRIPTION OF THE FIGURES

In order that the invention may be better understood, exemplary embodiments will now be described by way of example only, with references to the accompanying drawings, wherein.

DETAILED DESCRIPTION

With reference to the disclosure herein and the appended figures, a device and method for effecting full mating operable engagement between a coupler and a complementary corresponding socket will now be described, in accordance with various embodiments of the invention.

Figure 1:
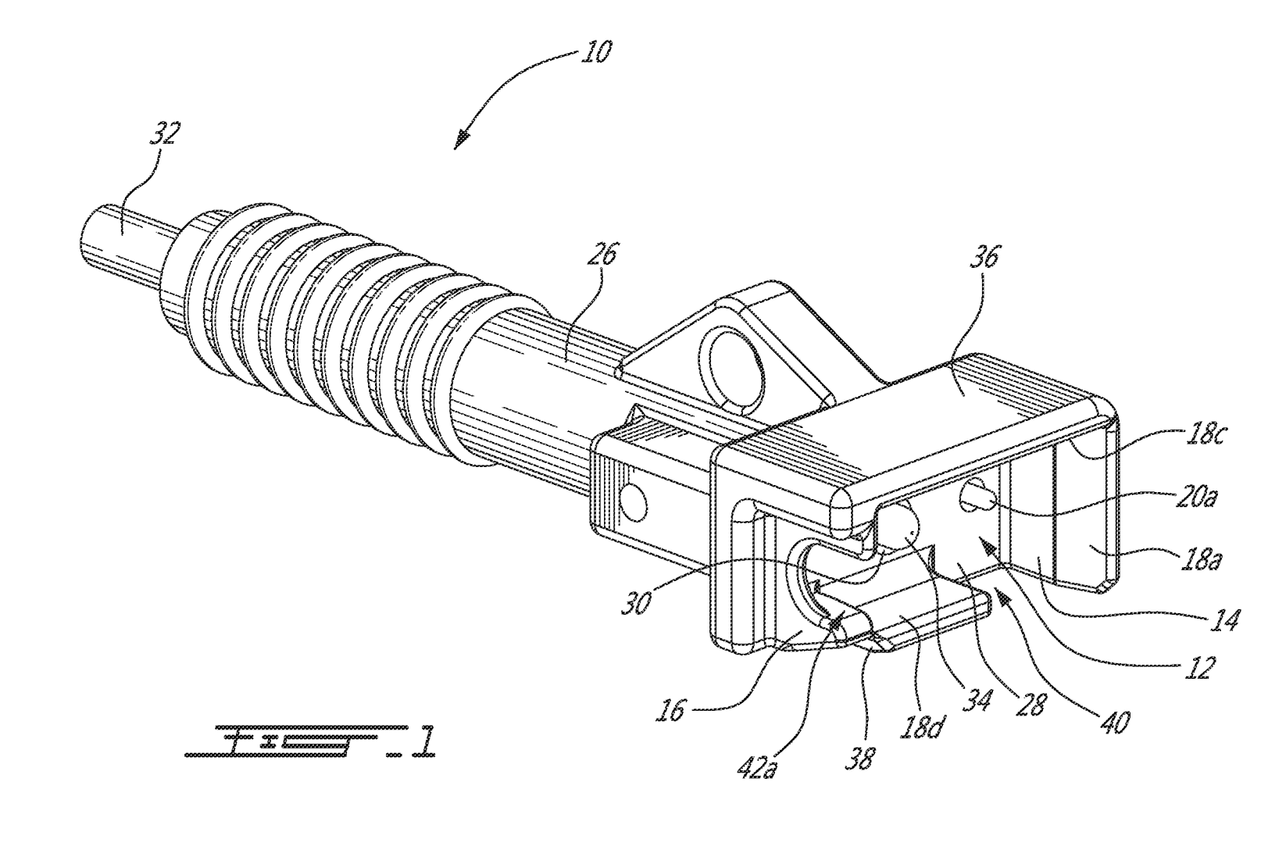
FIG. 1 is a side perspective view of a device for effecting full mating operable engagement of a coupler and a complementary corresponding socket in accordance with one embodiment.

With reference to FIG. 1, an embodiment of a device 10 for effecting full mating operable engagement between a coupler 50 and a complementary corresponding socket 52 is shown. The device 10 comprises a receiving region 12 at least partially defined by a first opposed sidewall portion 14 and a second opposed sidewall portion 16. The receiving region 12 is provided for receiving therein the coupler 50 and the complementary corresponding socket 52 and placing the two in full mating operable engagement 46, as is shown, for example, in FIG. 8.

At least one of the first 14 and second 16 opposing sidewall portions includes an inwardly tapered leading edge, as shown in FIG. 1, for example with respect to the first opposed sidewall portion 14 at reference numeral 18a. In some embodiments, the second opposed sidewall portion 16 also includes an inwardly tapered leading edge 18b (i.e. see FIG. 6).

Figure 8:
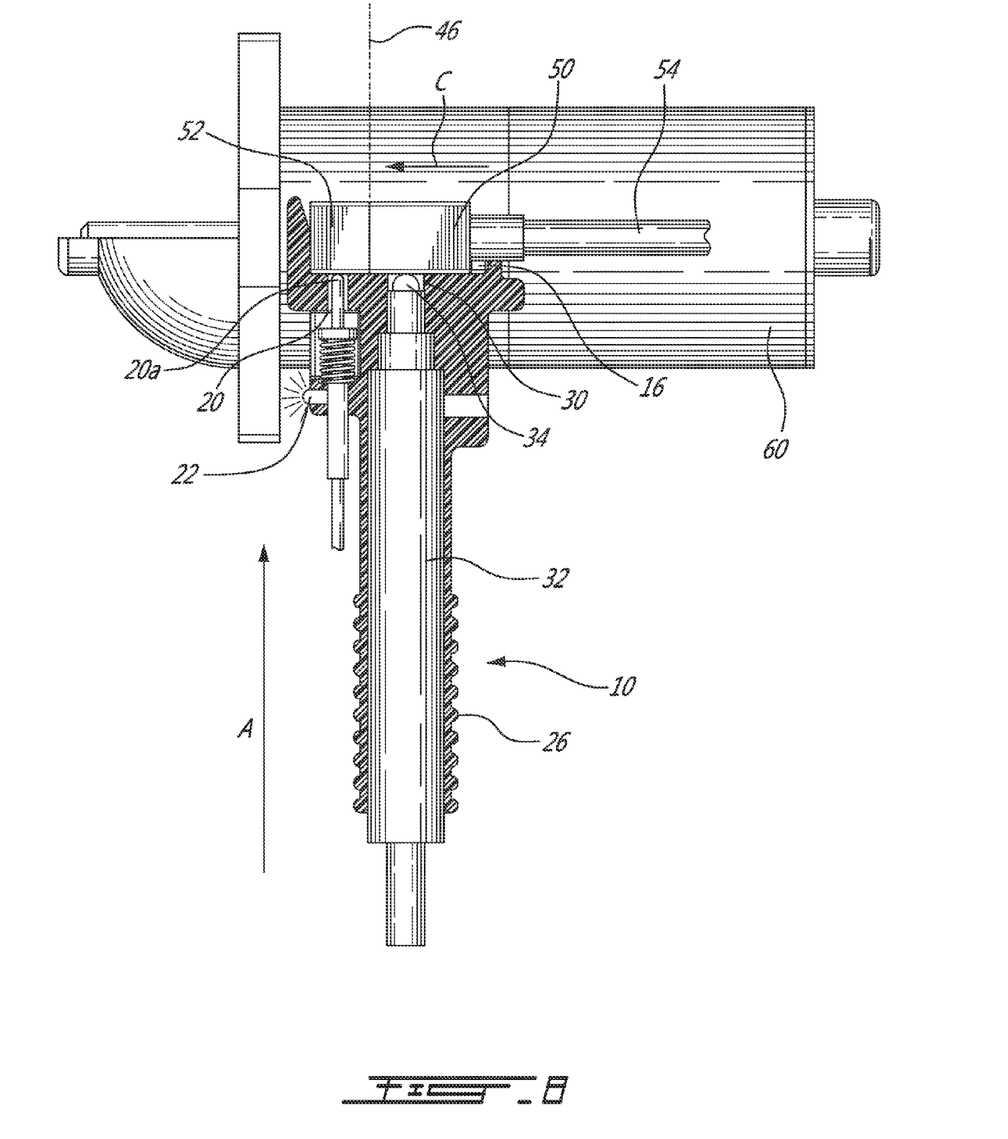

The first 14 and second 16 opposed sidewall portions are spaced apart in the receiving region 12 by a first distance Da designated to accommodate the coupler 50 and the complementary corresponding socket 52 only when the two are in the full mating operable engagement 46 so as to ensure that the coupler 50 and the complementary corresponding socket 52 are fully engaged and full operable engagement is thereby completed, as is shown in FIG. 8.

Second distance Db, between the inwardly tapered leading edge 18a, for example of the first opposed sidewall portion 14 and the second opposed sidewall portion 16, is broader than that first distance Da in the receiving region 12. Therefore, the coupler 50 and the complementary corresponding socket 52 fit between the inwardly tapered leading edge 18a and the second opposing sidewall portion 16 in at least a partially mating engagement as shown at 44 in FIG. 7 and as the device 10 is advanced the coupler 50 and the complementary corresponding socket 52 are squeezed together to fit in the receiving region 12.

Having now generally described the device 10, it should be noted that any embodiment of the present device 10 may include any of the additional features of the various embodiments as discussed herein and below. The exemplary embodiments herein disclosed are not intended to be exhaustive or to unnecessarily limit the scope of the disclosure. The exemplary embodiments have been chosen and described in order to explain the principles of the present device so that others skilled in the art may have an understanding of the instant device.

Figure 4:
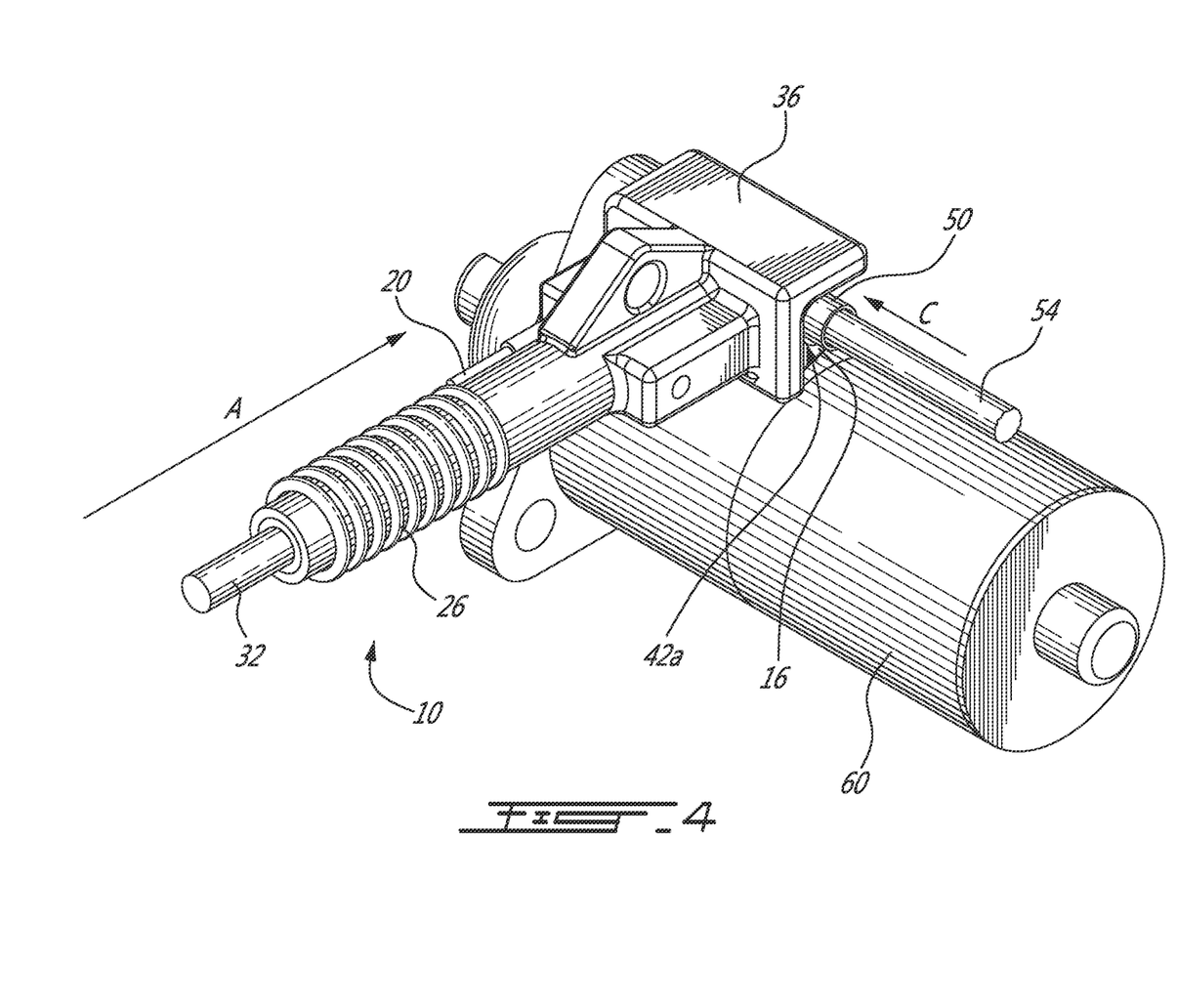
FIG. 4 is a top perspective view of the device of FIG. 3 engaging with the coupler and the complementary corresponding socket on the component.
Figure 5:
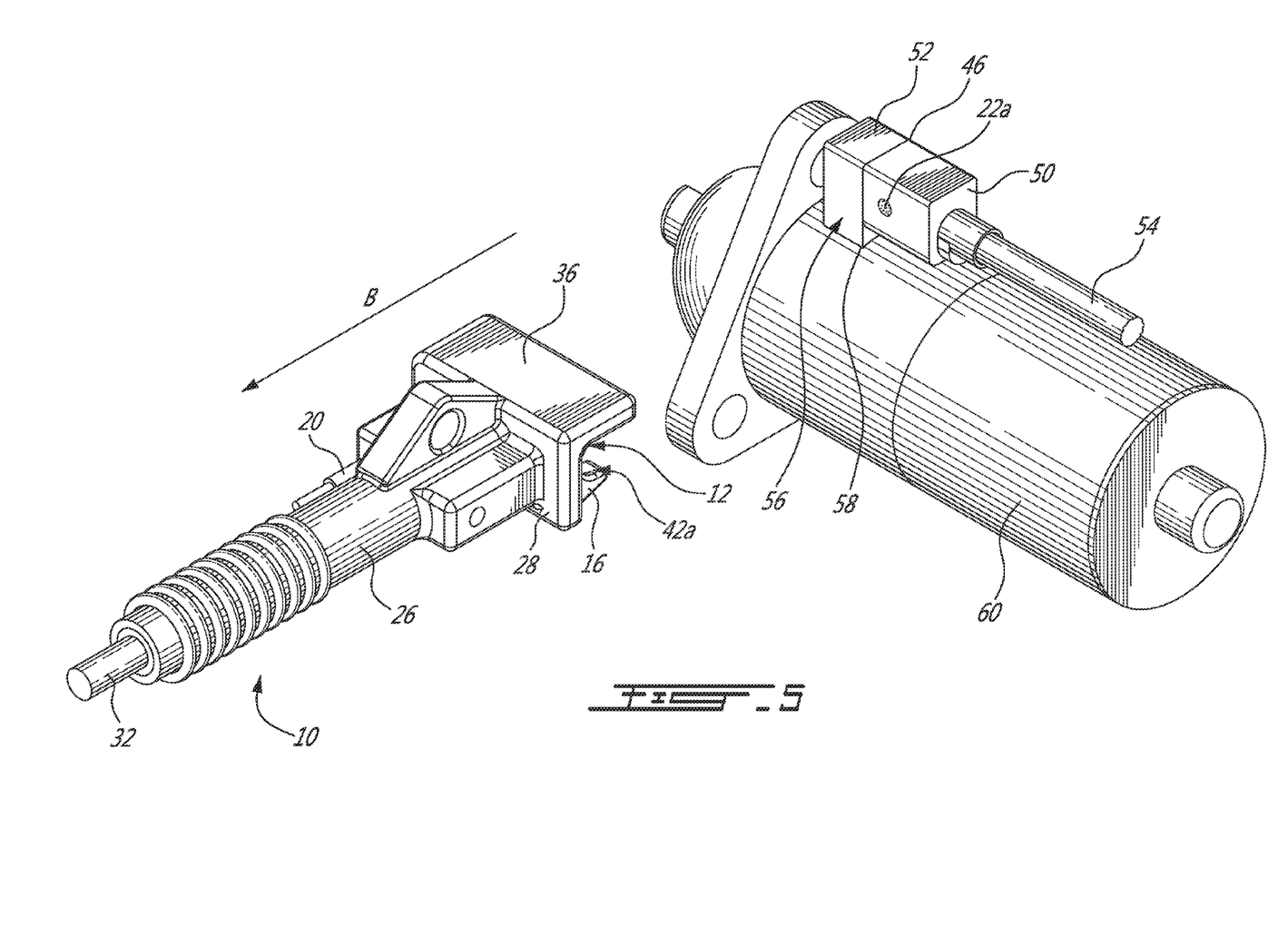
FIG. 5 is a top perspective view of the device of FIG. 4 withdrawing from the coupler and the complementary corresponding socket following the action shown in FIG. 4, with the coupler and the complementary corresponding socket now in full mating operable engagement.

In some embodiments, both the first 14 and second 16 opposing sidewall portions have inwardly tapered leading edges 18a and 18b, respectively and forming second distance Db, to accommodate therebetween the coupler 50 and the complementary corresponding socket 52 in various states of partial mating engagement 44. The inwardly tapered leading edge 18a, and in some embodiments both of the inwardly tapered leading edges 18a and 18b serve to receive therebetween the coupler 50 and the complementary corresponding socket 52 in the partial mating engagement. As the device 10 is moved along travel path A, shown in FIGS. 3, 4, 7 and 8, the coupler 50 and the complementary corresponding socket 52 slidingly move along travel path C to the full mating engagement 46 at first distance Da (FIG. 7) when received into the receiving region 12 between the first 14 and second 16 opposing sidewall portions as is shown in FIGS. 5 and 8. Once the coupler 50 and the complementary corresponding socket 52 have been received into the receiving region 12, between the first 14 and second 16 opposing sidewall portions, the coupler 50 and the complementary corresponding socket 52 are oriented relative one another in the full mating operable engagement 46 such that union between the two is operably complete so as to ensure proper communication between the coupler 50 and the complementary corresponding socket 52.

Figure 6:
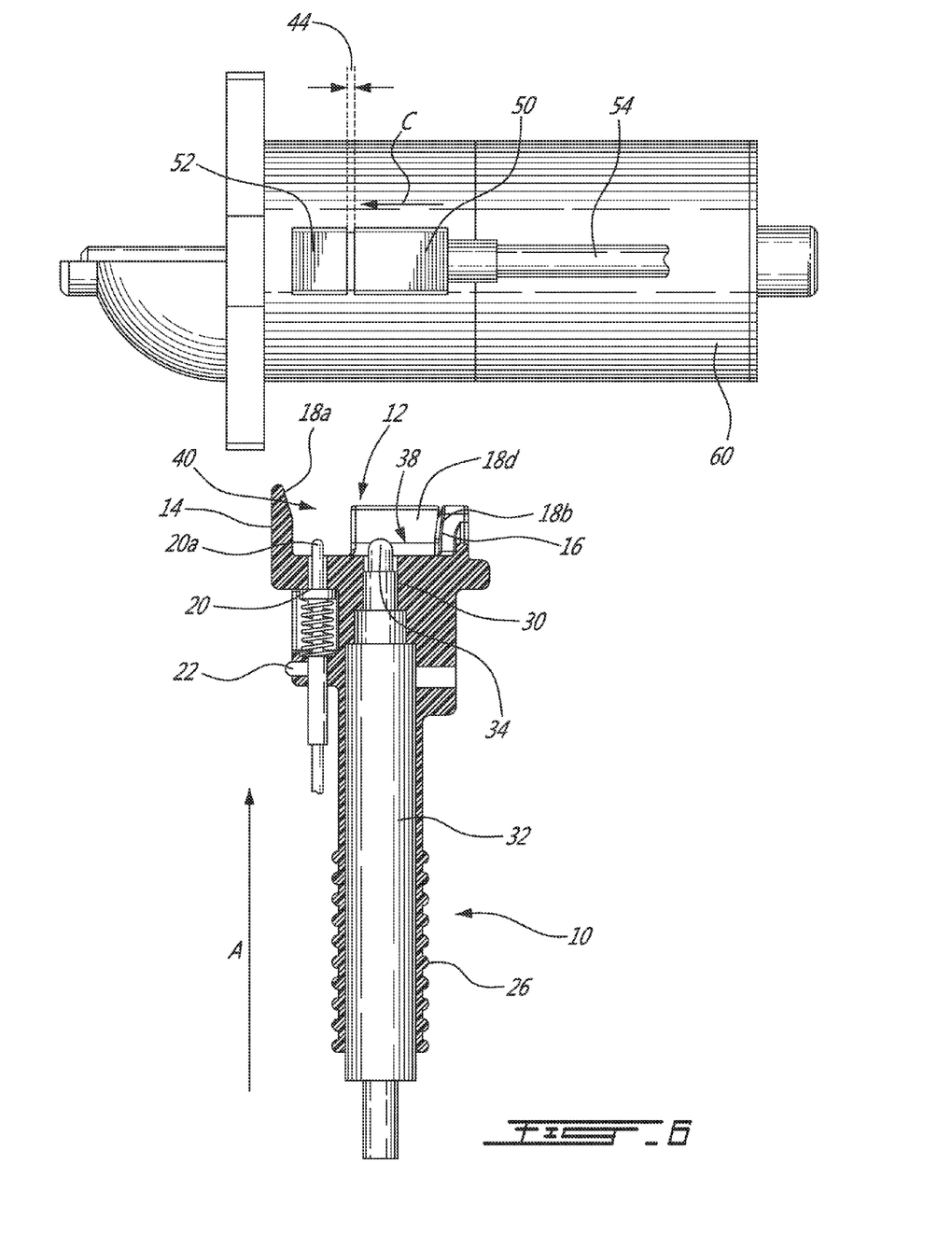
FIGS. 6 to 8 are cross-sectional top views of the device of FIG. 1 in operation sequentially showing the device aligned with and progressively engaging the coupler and the complementary corresponding socket when mounted on a component for effecting the full mating operable engagement of the coupler and the complementary corresponding socket.
Figure 7:
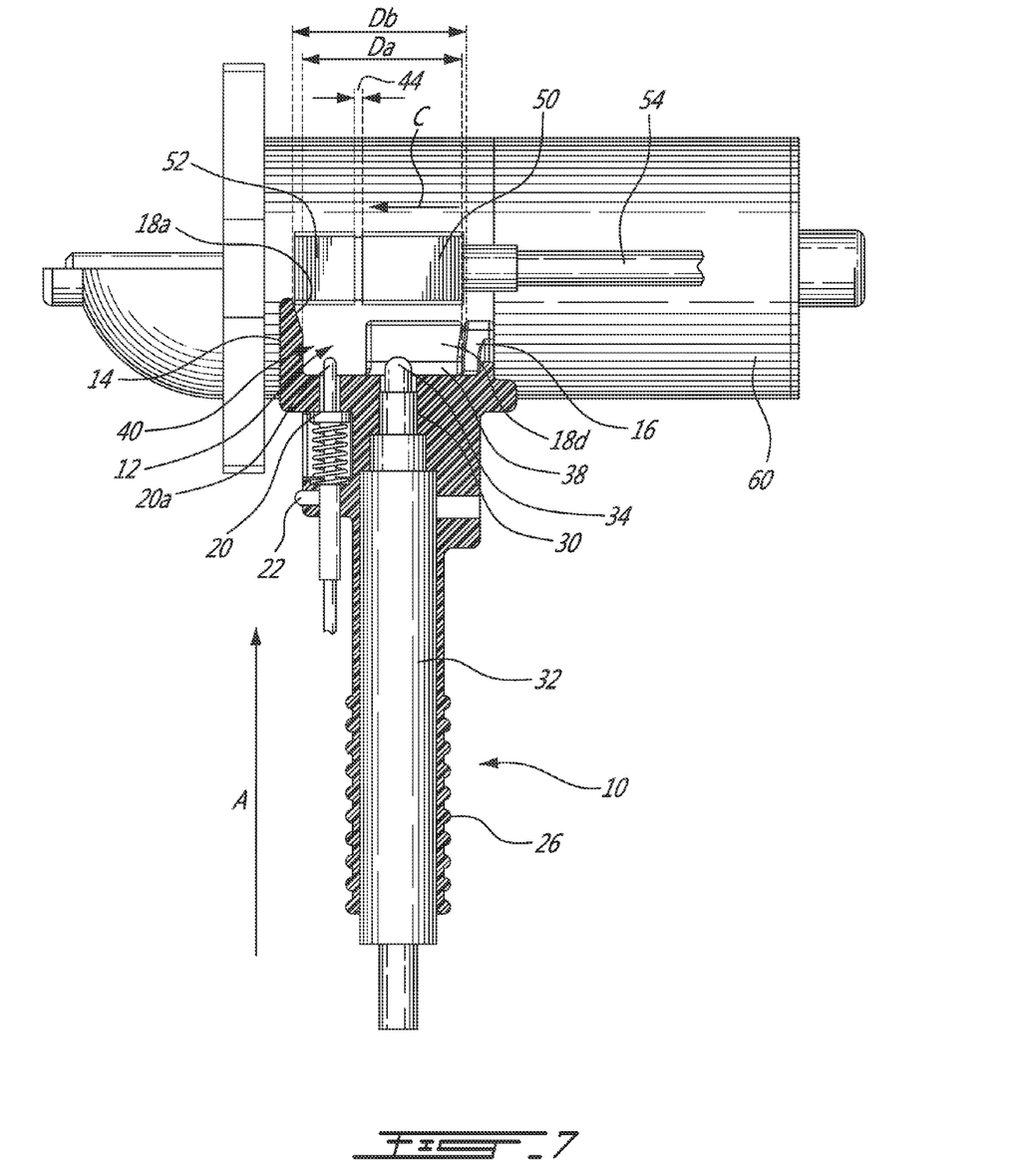

In some embodiments, a proximity switch 20 is provided in the receiving region 12. The proximity switch 20 in such embodiments is located in the receiving region 12 as is shown in the figures such that is activated by the coupler 50 and the complementary corresponding socket 52 being received in the receiving region 12. For example, as is shown in FIGS. 1, 6 and 7, an actuator portion 20a of the proximity switch 20 depends through a back wall 28 of the device 10 such that when the coupler 50 and the complementary corresponding socket 52 are received into the receiving region 12, the actuator portion 20a is depressed or otherwise activated. The actuator portion 20a of proximity switch 20 is shown in the depressed or activated position, for example in FIG. 8.

Although for exemplary purposes the proximity switch actuator portion 20a is shown depending through a back wall 28 of the device, it should be appreciated that the proximity switch may also be suitably located in other locations wherein it can be similarly activated when the coupler 50 and the complementary corresponding socket 52 are received into the receiving region 12. For example, although not shown, the proximity switch 20 may also be located in the receiving region 12, with the actuator portion 20a depending through one of the opposed sidewall portions. In various embodiments, the proximity switch 20 may be activated in the receiving region 12 by either one or both the coupler 50 and the complementary corresponding socket 52. Additionally, although the present device 10 is shown in the figures with a mechanically depressible proximity switch 20, those of skill in the art will readily recognize that other variation of proximity switches may be employed for activation when the coupler 50 and the complementary corresponding socket 52 are received into the receiving region 12. For example, inductive sensors, capacitive sensors, photoelectric sensors or magnetic sensors, among other suitable alternative types of proximity switches known in the art may be utilized. For example, in some embodiments, the proximity switch 20 may be a Short Barrel Inductive Prox available through Omron® Industrial Automation.

Furthermore, in some embodiments, the proximity switch 20 is operable to output proximity switch indicia 22 to alert a technician when the coupler 50 and the complementary corresponding socket 52 have been received into the receiving region 12 at first distance Da. As shown, for example in FIG. 8, when the coupler 50 and the complementary corresponding socket 52 have been received into the receiving region 12 and the actuator portion 20a is thus depressed, a light is illuminated, thereby providing the indicia 22. Other forms of indicia, such as an audible signal may additionally or in the alternative be provided. In additional embodiments, when the coupler 50 and the complementary corresponding socket 52 are received in the receiving region 12, the activated proximity switch may send a signal to a data acquisition device 24 as shown generally in FIG. 3. The data acquisition device 24 may be configured to log information that a technician has employed the device 10 to complete the full mating engagement of the coupler 50 and the complementary corresponding socket 52 as a means of quality control, for example in an assembly line setting. Also the data acquisition device 24 may be configured to provide an alert that the union of the coupler 50 and the complementary corresponding socket 52 have not been confirmed using the device 10. For example, in an assembly line setting, should the data acquisition device 24 not receive a signal from the device 10 that a connection has been checked using the device 10 and the product being produced advances to next production station, a programmed logic control governing the assembly line may be configured to halt the assembly line until the union between the coupler 50 and the complementary corresponding socket 52 have been properly checked using the device 10. Additionally, the programmed logic control may be configured to provide a visual or audible alert to notify a technician that the union has not been checked so that corrective action can be taken.

In some embodiments, the device 10 may also include a visual marking means which marks a visual indicia 22a, as shown in FIG. 5, on one or both of the coupler 50 and the complementary corresponding socket 52 when they are received into the receiving region 12. Such a visual indicia 22a or marking may be useful in identifying problems with operation of a product once it has left the assembly line or in post-production quality control check. For example if no visual marking 22a is found on the product to indicate that the device 10 was used to ensure full mating operable engagement between the coupler 50 and the complementary corresponding socket 52 a diagnosis as to the problem with regard to the proper functioning of the product may be assisted. Accordingly, in some embodiments, the device includes a marking instrument 32 having a marking tip 34. As shown in the figures, the marking tip depends into the receiving region 12 and when the coupler 50 and the complementary corresponding socket 52 are received into the receiving region 12 to effect full mating operable engagement 46, the mark or visual indicia 22a is left to indicate post-assembly that the device 10 was used to check the union between the coupler 50 and the complementary corresponding socket 52.

The device 10, in some embodiments further includes a handle portion 26 coupled exteriorly to the receiving region 12. The handle portion 26, shown in figures and with particular reference to FIGS. 1, 2, 3 and 6 to 8 being operably coupled to the receiving region 12 is provided such that the device can be gripped and moved along travel path A so as to interact with the coupler 50 and the complementary corresponding socket 52 to effect the full mating operable engagement 46 from the partial mating engagement 44 position, as sequentially shown in FIGS. 6 to 8. Once the coupler 50 and the complementary corresponding socket 52 have been received into the receiving region 12, the handle portion 26 can be used to withdraw the device 10 along travel path B, shown in FIG. 5.

Also, as shown in the figures, in some embodiments, the handle portion 26 may be coupled to the back wall 28. FIGS. 1, 2 and 6 to 8 show the marking instrument 32, when the handle portion is coupled to the back wall 28, depending through an aligned passage 30 of the handle portion 26 and the receiving region 12 where the marking tip 34 extends into the receiving region 12. As noted above, with the marking tip 34 extending into the receiving region 12, a mark 22a can be left on the coupler 50 and/or the complementary corresponding socket 52 so as to indicate that the device has been used to check and ensure that the coupler 50 and the complementary corresponding socket 52 are in full mating operable engagement 46. The aligned passage 30 in some embodiments is dimensioned so as to accommodate and maintain the marking instrument 32 in a friction fit therein. In alternative embodiments (not shown) the marking instrument 32 may be further maintained in the aligned passage 30 by aid of setscrew or other retaining means.

Turning now to FIG. 1, an embodiment of the device 10 is shown wherein the receiving region 12 is further defined by a top receiving region wall portion 36 and a bottom receiving region wall portion 38. Furthermore, although not shown in the figures, in some embodiments it is contemplated that the receiving region 12 may be defined by only the first 14 and second 16 opposed sidewall portions and/or one or both of the top receiving region wall portion 36 and bottom receiving region wall portion 38. Additionally, in some embodiments, the top receiving region wall portion 36 and bottom receiving region wall portion 38 may include respective inwardly tapered leading edges 18c and 18d. The inwardly tapered leading edges 18c and 18d serve to assist in guiding the device 10 for engagement with the coupler 50 and the complementary corresponding socket 52 in partial mating engagement 44 such that the coupler 50 and the complementary corresponding socket 52 can be more easily received into the receiving region 12. Thereby the tapered leading edges 18c and 18d can act as guiding or self-alignment formations.

In some embodiments the first opposed sidewall portion 14, the second opposed sidewall portion 16, the top receiving region wall portion 36 and/or the bottom receiving region wall portion 38 may be contoured in the receiving region 12 to align with complementary contours and/or formations belonging to the coupler 50 and/or the complementary corresponding socket 52. Such contours may be provided such that the complementary contours and/or formations can fit therewith in the receiving region 12 and the device 10 is thereby made specific to a given set of coupler 50 and complementary corresponding socket 52.

Figure 2:
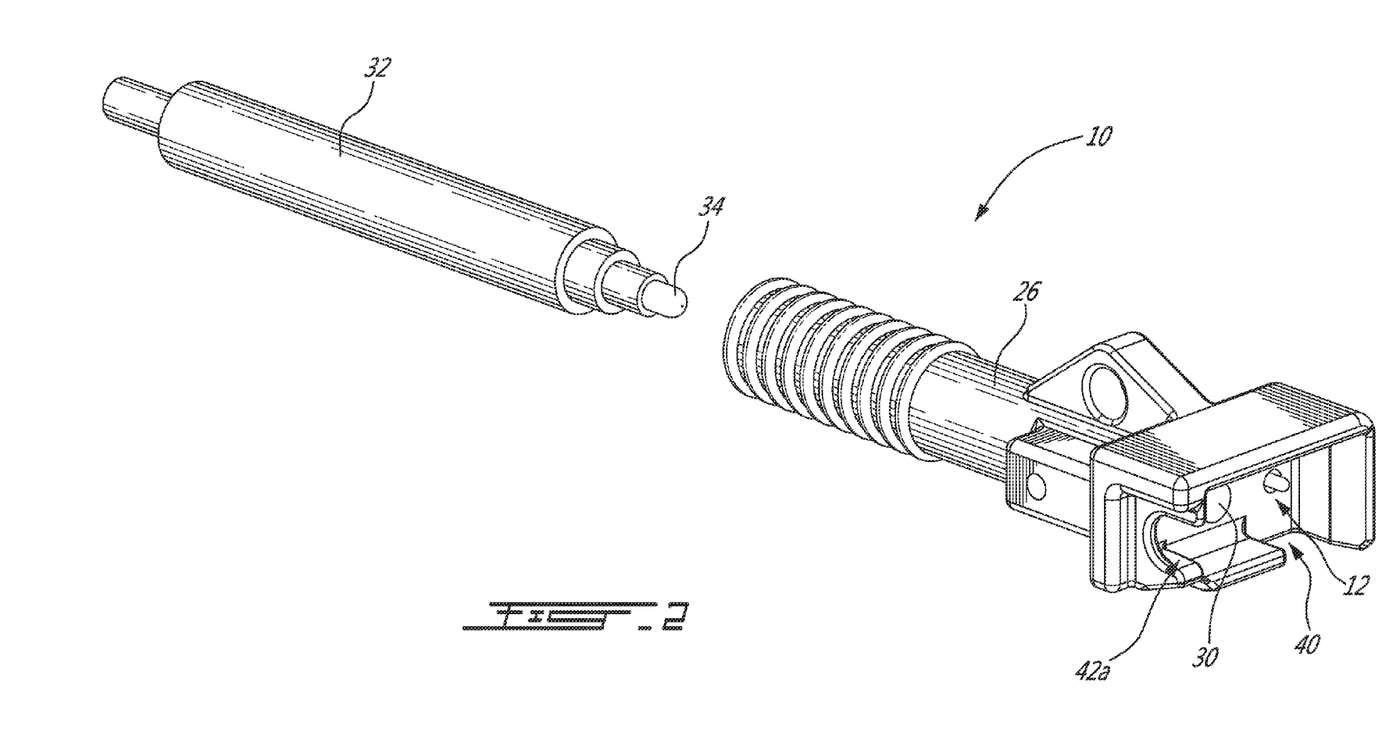
FIG. 2 is a side perspective view of the device of FIG. 1 and an associated marking instrument.
Figure 3:
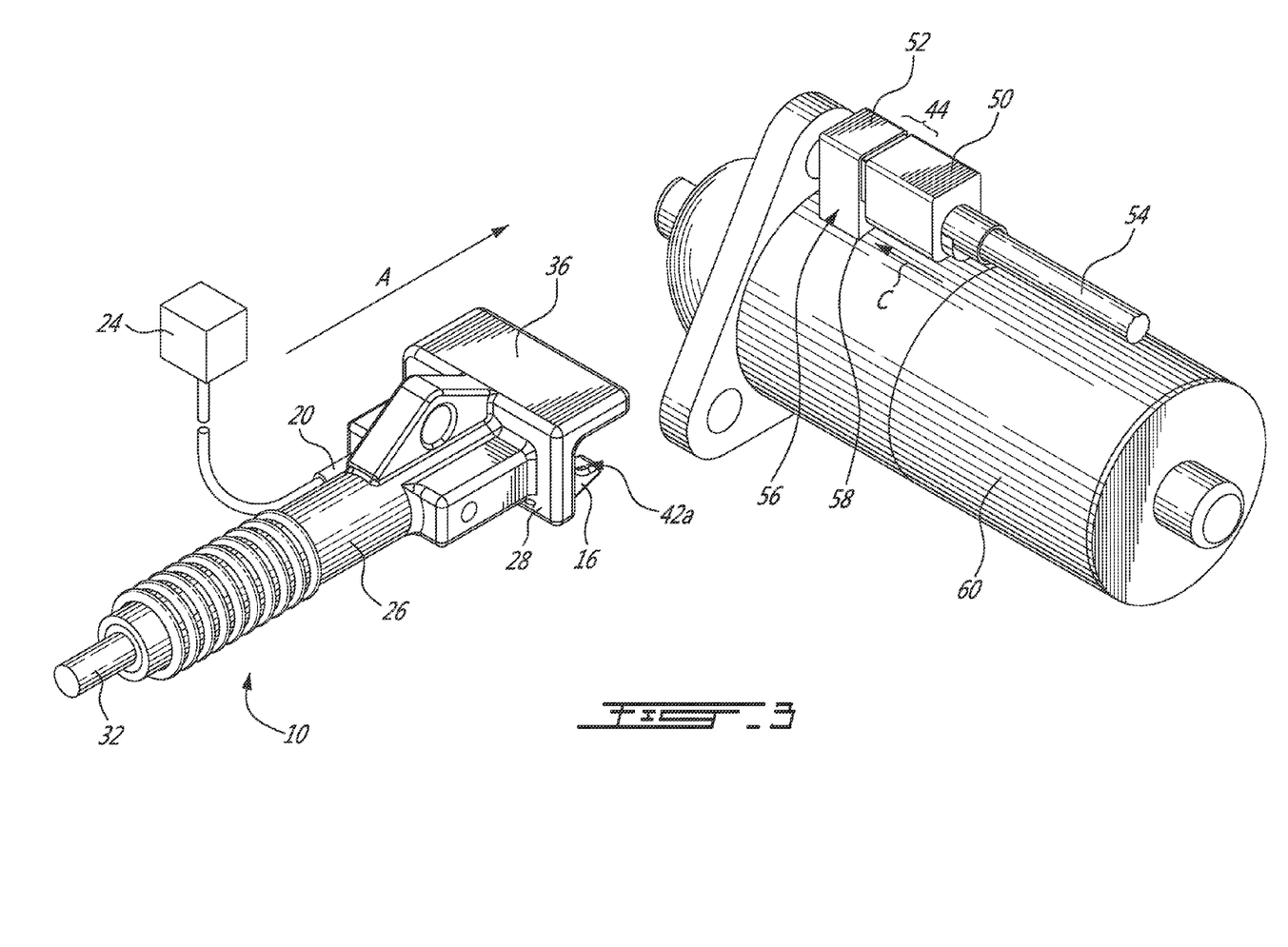
FIG. 3 is a top perspective view of the device of FIG. 1 aligned for engagement with the coupler and the complementary corresponding socket when in a partial mating engagement relationship and mounted on a component.

Shown, for example, in FIG. 3, the complementary corresponding socket 52 is generally mounted at 58 to a component 60. For example, the complementary corresponding socket 52 may be mounted to an automotive starter motor (component 60) by way an integrated or coupled mounting stem 56. Internal to the complementary corresponding socket 52 are leads (not shown) which provide connection to various required areas of the component 60 to supply, for example electrical energy to the starter motor when the coupler 50 and the complementary corresponding socket 52 are in full mating operable engagement 46. Electrical energy is, in such an exemplary situation, supplied to the coupler 50 by way of a supply line 54. Accordingly, the bottom receiving region wall portion is provided with a stem-receiving notch 40, shown in FIGS. 1 and 2. With reference to FIG. 3, as the device is moved along travel path A and the coupler 50 and the complementary corresponding socket 52 are received into the receiving region 12 the mounting stem 56 of the complementary corresponding socket 52 is received into the stem-receiving notch 40 such that the device can be properly engaged and effect full mating operable engagement 46 of the coupler 50 and the complementary corresponding socket 52. Furthermore, at least one of the first 14 or second 16 opposed sidewall portions may include a supply line receiving notch 42a as shown in FIGS. 1 to 3 for receiving therein the supply line 54 extending from the coupler 50, as shown in FIG. 4 when the coupler 50 and the complementary corresponding socket 52 are received into the receiving region 12. In some embodiments, not shown, it is contemplated that both of the first 14 and second 16 opposing sidewall portions may have supply line receiving notches or notches for receiving protrusions associated with the coupler 50 and/or the complementary corresponding socket 52.

However, although not shown, as one of skill in the art will appreciate in various other types of components 60, the supply line 54 may provide signals (in the case of data transfer to and from a given component 60), air (in the case of a pneumatically operated component 60) or hydraulic fluid (in the case of a hydraulically operated component 60). Therefore the device 10 may be used to effect full mating operable engagement 46 of a variety of type of connections between a given coupler 50 and a complementary corresponding socket 52.

In order to mitigate possible damage to the coupler 50, the complementary corresponding socket 52, the component 60 or other parts associated with the action of full mating operable engagement between the coupler 50 and the complementary corresponding socket 52 from partial mating engagement 44, at least the first 14 and/or second 16 opposing sidewalls of device 10, in some embodiments, are made from a material which will fracture or deform so as to not damage the aforesaid parts during use should excessive force be applied. For example, in an assembly line setting, a technician may accidentally apply excessive force to the device 10 to effect full mating operable engagement 46 when carrying out the task. Therefore, by manufacturing at least first 14 and/or second 16 opposing sidewalls from materials designed to mitigate potential damage to any one of the parts, cost savings due to accidental damage during assembly of the coupler 50 and the complementary corresponding socket 52 may be realized. For example, at least the first 14 and/or second 16 opposing sidewalls may have a tensile strength of from about 45 MPa to about 70 MPa. In some embodiments, the material may have a tensile strength of from about 50 MPa to about 65 MPa. For example, the material used may be VeroBlack FullCure® 870, VeroWhitePlus FullCure® 835, VeroGray FullCure® 850, VeroClear FullCure® 810, VeroBlue FullCure® 840, FullCure® 720, or an ABS-like material (RGD5160-DM) supplied by Objet Geometries Ltd. Furthermore, the material may be a plastics material, a metals material or other material which may be suitably manufactured into the device. However, one of skill in the art will recognize that the type and strength of the material used to fabricate at least the first 14 and/or second 16 opposing sidewalls will be relative to the task at hand. Also, for ease of manufacturing the device 10, the handle portion 26 and the area defining the receiving region 12 may be monolithically formed, for example from a plastics material.

Turing now to FIGS. 6 to 8 specifically, a method for automatically verifying, using the exemplary device 10 of FIG. 1 to effect and/or verify the full mating operable engagement 46 of the coupler 50 and the complementary corresponding socket 52 from partial mating engagement 44 thereof, will now be described. The coupler 50 and the complementary corresponding socket 52 are first aligned and placed into partial mating engagement 44 as shown at 44 in FIG. 6. The device 10 is then aligned with the coupler 50 and the complementary corresponding socket 52, as shown in FIG. 7 such that the coupler 50 and the complementary corresponding socket 52 are able to be received into the receiving region 12. As the device is urged along travel path A, the coupler 50 and the complementary corresponding socket 52 are contacted with the tapered leading edge 18a or 18b or both belonging to the first opposed sidewall portion 14 and/or the second opposed sidewall portion 16 respectively between second distance Db. Urging the device 10 along travel path A causes the coupler 50 and the complementary corresponding socket 52 to move toward one another along travel path C as they are received into the receiving region 12 between distance Da thereby transitioning their relationship from the partial mating engagement 44 to full mating operable engagement 46 as shown in FIG. 8. With the coupler 50 and the complementary corresponding socket 52 in the receiving region 12, the complementary corresponding socket 52 contacts the proximity switch actuator portion 20a to activate the proximity switch 20, which in turn provides an indicia that the coupler 50 and the complementary corresponding socket 52 have been received into the receiving region 12. The marking tip 34 also contacts the complementary corresponding socket 52 so as to leave behind a mark 22a and thereby provide a visual indicia, and thereby visually confirm that the coupler 50 and the complementary corresponding socket 52 have been received into the receiving region 12 and full mating operable engagement 46 has been effected. The device 10 is then withdrawn along travel path B as shown in FIG. 5.

Accordingly, full mating operable engagement of the coupler 50 and the complementary corresponding socket 52 has been checked, and in some embodiments docketed by data acquisition device 24 and a visual mark 22a indicating such action has been left on the assembled and installed union.

In other words, with reference to the figures for example, the device 10 is held in one hand by a technician and pushed forward to engage an electrical coupler 50 and a mating electrical socket 52 on a starter motor 60. The tapered opening defined between the first 14 and second 16 opposing sidewall portions of the device 10 squeezes the electrical coupler 50 and the mating electrical socket 52 together as the device is advanced towards the starter motor 60 in order to set or fully connect the electrical coupler 50 to the mating electrical socket 52. At the time that the two parts have been fully connected, a marking tip 34 of a paint marker 32 located in a passage 30 in the handle 26 applies a paint dot onto at least one of the electrical coupler 50, the mating electrical socket 52 or the starter motor 60 to visually indicate that the union of the electrical coupler 50 and the mating electrical socket 52 has been set. At the same time, spring-loaded plunger 20a of a proximity switch 20 is depressed against the electrical coupler 50 to activate the proximity switch 20. In some embodiments, in addition to the proximity switch indicia 22 being illuminated, an electrical signal is sent to a programmed logic controller 24 to verify that electrical coupler 50/mating electrical socket 52 union has been set for a given starter motor 60 assembly and installation.

It is to be understood that the above description it is intended to be illustrative, and not restrictive. Many other embodiments will be apparent to those skilled in the art, upon reviewing the above description. The scope of the invention should, therefore, be determined with reference to the appended claims, along with the full scope of equivalents to which such claims are entitled.

Although the present invention has been described with reference to specific exemplary embodiments, it will be evident that various modifications and changes may be made to these embodiments without departing from the broader spirit and scope of the disclosed subject matter as defined by the appended claims.

What is claimed is:

1. A device for effecting full mating operable engagement between a coupler and a complementary corresponding socket, the device comprising:
   a receiving region at least partially defined by first and second opposed sidewall portions spaced apart by a distance designated to receive therebetween the coupler and the complementary corresponding socket only when in full mating operable engagement;
   at least one of said first and second opposed sidewall portions having an inwardly tapered leading edge for allowing the coupler and the complementary corresponding socket to be received between said first and second opposed sidewall portions at said leading edge when in at least partial mating engagement;
   the device bringing the coupler and the corresponding socket into the full mating operable engagement from said at least partial mating engagement upon being urged between said first and second opposed sidewall portions from said leading edge and into said receiving region.

2. The device as defined in claim 1, wherein both of said first and second opposed sidewall portions have tapered leading edges.

3. The device as defined in claim 1, further comprising a proximity switch depending into said receiving region and activated by at least one of the coupler and the complementary corresponding socket once in said receiving region.

4. The device as defined in claim 3, wherein said proximity switch is operable to output an indicia for indicating that the coupler and the complementary corresponding socket have been received in said receiving region.

5. The device as defined in claim 3, wherein said proximity switch is operatively coupleable to a data acquisition device for logging information indicative of the coupler and the complementary corresponding socket being received into said receiving region and thereby in the full mating operable engagement.

6. The device as defined in claim 1, further comprising a handle portion exteriorly extending from said receiving region.

7. The device as defined in claim 6, wherein said handle portion exteriorly extends from a back wall of said receiving region.

8. The device as defined in claim 6, said handle portion and said receiving region having an aligned passage for receiving therein a marking instrument, a marking tip of said marking instrument depending into said receiving region to mark at least one of the coupler and the complementary corresponding socket once in said receiving region.

9. The device as defined in claim 1, said receiving region being further defined by a top receiving region wall portion.

10. The device as defined in claim 9, wherein said top receiving region wall portion includes an inwardly tapered leading edge portion.

11. The device as defined in claim 1, said receiving region being further defined by a bottom receiving region wall portion.

12. The device as defined in claim 11, wherein said bottom receiving region wall portion includes an inwardly tapered leading edge.

13. The device as defined in claim 11, wherein the complementary corresponding socket is mounted to a mount via a stem, said bottom receiving region wall portion having at least one stem-receiving notch for receiving the stem therein as the complementary corresponding socket is received in said receiving region.

14. The device as defined in claim 1, wherein one or more supply lines are coupled to at least one of the coupler and the complementary corresponding socket; and wherein one or more corresponding supply line receiving notches are correspondingly defined in one or more of said first and second opposed sidewall portions for receiving therein the one or more supply lines as the coupler and the complementary corresponding socket are received into said receiving region.

15. The device as defined in claim 14, the one or more supply lines comprising an electrically conductive line, a pneumatic line or a hydraulic line.

16. The device as defined in claim 1, wherein at least said first and second opposed sidewall portions are made from a material having a tensile strength of from 45 MPa to about 70 MPa.

17. The device as defined in claim 1, wherein said device is monolithically formed.

18. A method for automatically verifying full mating operable engagement between a coupler and a complementary corresponding socket comprising:
aligning a verification tool with the coupler and the complementary corresponding socket when in at least partial mating engagement, said verification tool having a receiving region at least partially defined by first and second opposed sidewall portions spaced apart by a distance designated to receive therebetween the coupler and the complementary corresponding socket only when in the full mating operable engagement, at least one of said first and second opposed sidewall portions having an inwardly tapered leading edge;
engaging said coupler and said complementary corresponding socket between said first and second opposed sidewall portions at said leading edge in said at least partial mating engagement; and
urging said coupler and said complementary corresponding socket into said receiving region thereby sliding the coupler and the complementary corresponding socket towards one another so as to verifiably effect the full mating operable engagement.

19. The method as defined in claim 18, further comprising having at least one of the coupler and the complementary corresponding socket automatically trigger a proximity switch when received in said receiving region, said proximity switch outputting an indicia indicating that said coupler and said complementary corresponding socket are in the full mating operable engagement.

20. The method as defined in claim 19, further comprising automatically marking at least one of the coupler and the complementary corresponding socket when received in said receiving region via a marking instrument having a marking tip disposed in said receiving region, thereby visually confirming that the coupler and the complementary corresponding socket are in the full mating operable engagement.

* * * * *